US008847439B2

(12) United States Patent
Pesek et al.

(10) Patent No.: US 8,847,439 B2
(45) Date of Patent: Sep. 30, 2014

(54) MULTIPLE-CONTACT SWITCHES

(75) Inventors: Thomas Andrew Pesek, Ankeny, IA (US); Brian Joseph Burlage, Marshalltown, IA (US); Carter Bill Cartwright, Ames, IA (US); Clyde T. Eisenbeis, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 228 days.

(21) Appl. No.: 13/277,736

(22) Filed: Oct. 20, 2011

(65) Prior Publication Data

US 2013/0099593 A1 Apr. 25, 2013

(51) Int. Cl.
*B23K 11/24* (2006.01)
*H01H 47/00* (2006.01)

(52) U.S. Cl.
CPC .................................. *H01H 47/001* (2013.01)
USPC ........... 307/112; 307/113; 307/115; 307/116; 361/88; 377/5; 340/603; 315/291; 315/360

(58) Field of Classification Search
CPC .......... B23K 11/248; H02J 3/04; H01R 29/00
USPC ......... 307/112; 377/5; 340/323, 365; 209/88, 209/74; 53/53
See application file for complete search history.

(56) References Cited

U.S. PATENT DOCUMENTS 3,712,468 A * 1/1973 Wenner et al. ................ 209/551
3,886,543 A * 5/1975 Marin ............................. 341/24
4,491,954 A * 1/1985 Genuit .............................. 377/5
6,710,553 B2 * 3/2004 Logan ........................... 315/291
2007/0257628 A1 11/2007 Gofman et al.

FOREIGN PATENT DOCUMENTS

WO 2008080086 7/2008

OTHER PUBLICATIONS

International Searching Authority, "Written Opinion", issued in connection with PCT Patent Application No. PCT/US2012/059997, mailed Mar. 12, 2013, 6 pages.
International Searching Authority, "International Search Report", issued in connection with PCT Patent Application No. PCT/US2012/059997, mailed Mar. 12, 2013, 5 pages.

* cited by examiner

*Primary Examiner* — Rexford Barnie
*Assistant Examiner* — Jagdeep Dhillon
(74) *Attorney, Agent, or Firm* — Hanley, Flight & Zimmerman, LLC

(57) ABSTRACT

Multiple-contact switches are disclosed. An example multiple-contact switch disclosed herein includes a double throw switch having a common terminal, a first throw terminal, and a second throw terminal, the common terminal being coupled to a reference; a first throw circuit coupled to the first throw terminal, the first throw circuit to output an open signal to a process control device when the common terminal is substantially in contact with one of the first throw terminal or the second throw terminal; and a second throw circuit coupled to the second throw terminal, the second throw circuit to cause the first throw circuit to output a close signal to the process control device when the common terminal is substantially in contact with the other one of the first throw terminal or the second throw contact terminal, wherein at least one of the open signal or the close signal corresponds to the reference.

19 Claims, 5 Drawing Sheets

MULTIPLE-CONTACT SWITCHES

FIELD OF THE DISCLOSURE

This disclosure relates generally to process control switches and, more particularly, to multiple-contact switches.

BACKGROUND

In process control systems, valves and other process control devices have actuators that may be controlled by liquid level detectors, pressure switches, flow switches, and/or other process variable switches. In some examples, the switches have two states (e.g., on/off, open/close, etc.) and are calibrated to cause the switches to switch between the states in response to an associated sensor or detector determining that an associated condition is true or false. For example, a liquid level detector may be calibrated to cause a switch to enter an on state when a liquid level in a vessel or container increases above (or decreases below) a threshold level.

SUMMARY

An example multiple-contact switch disclosed herein includes a double throw switch having a common terminal, a first throw terminal, and a second throw terminal, the common terminal being coupled to a reference; a first throw circuit coupled to the first throw terminal, the first throw circuit to output an open signal to a process control device when the common terminal is substantially in contact with one of the first throw terminal or the second throw terminal; and a second throw circuit coupled to the second throw terminal, the second throw circuit to cause the first throw circuit to output a close signal to the process control device when the common terminal is substantially in contact with the other one of the first throw terminal or the second throw contact terminal, wherein at least one of the open signal or the close signal corresponds to the reference.

Another example multiple-contact switch disclosed herein includes a double throw switch having a common terminal, a first throw terminal, and a second throw terminal, the common terminal being coupled to reference; a first throw circuit coupled to the first throw terminal, the first throw circuit to output an open signal to a process control device when the common terminal is substantially in contact with one of the first throw terminal or the second throw terminal; and a second throw circuit coupled to the second throw terminal, the second contact terminal to output a close signal to the process control device when the common terminal is substantially in contact with the other one of the first throw terminal or the second throw terminal, wherein at least one of the open signal or the close signal corresponds to the reference.

A disclosed example method includes receiving a first output signal from a switch, the first output signal having a first value of two possible values, actuating a process control device based on the first output signal, receiving a second output signal from the switch, the second output signal having a second value of the two possible values, determining whether receiving the second output signal corresponds to a switch bouncing condition, when receiving the second output signal does not correspond to the switch bouncing condition, actuating the process control device based on the second output signal, and when receiving the second output signal corresponds to the switch bouncing condition, preventing actuation of the process control device.

DETAILED DESCRIPTION

Figure 1:
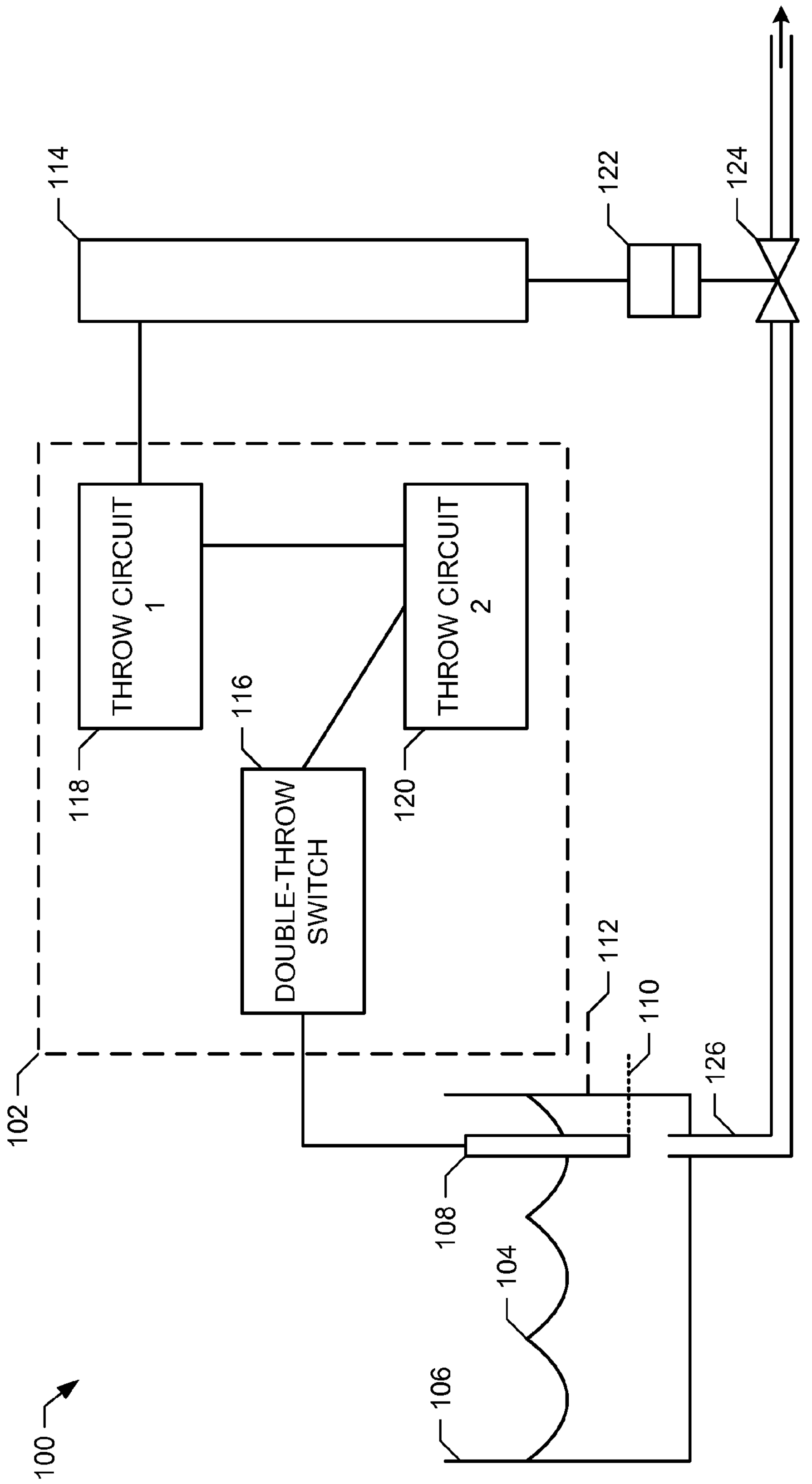
FIG. 1 depicts an example process control system including a multiple-contact switch to control a valve.

Switches may exhibit bouncing (e.g., rapid mechanical and electrical connection and disconnection) when a change in state occurs. Such bouncing can cause electrical components connected to the switch to experience similarly rapid changes, which can cause poor accuracy of detection and/or result in rapid wear on the controlled process control device and/or associated components. Example multiple-contact switches disclosed herein have decreased sensitivities to electromechanical bouncing without suffering from reductions in responsiveness, which is often found in known solutions.

Some example multiple-contact switches disclosed herein include: a double throw switch having a common contact, a first throw contact, and a second throw contact, the common contact being coupled to reference; a first contact circuit coupled to the first throw contact, the first contact circuit to output an open signal to a process control device (e.g., an actuator) when the common contact is substantially in contact (e.g., continuous and/or bouncing contact) with one of the first throw contact or the second throw contact, and a second contact circuit coupled to the second throw contact, the second contact circuit to cause the first contact circuit to output a close signal to the process control device when the common contact is substantially in contact with the other one of the first throw contact or the second throw contact, wherein at least one of the open signal or the close signal corresponds to the reference.

Some other example multiple-contact switches disclosed herein include: a double throw switch having a common contact, a first throw contact, and a second throw contact, the common contact being coupled to reference, a first contact circuit coupled to the first throw contact, the first contact circuit to output an open signal to a process control device when the common contact is substantially in contact with one of the first throw contact or the second throw contact, and a second contact circuit coupled to the second throw contact, the second contact circuit to output a close signal to the process control device when the common contact is substantially in contact with the other one of the first throw contact or the second throw contact, wherein at least one of the open signal or the close signal corresponds to the reference.

Some example methods disclosed herein include receiving a first output signal from a switch, the first output signal having a first value of two possible values, actuating a process control device based on the first output signal, receiving a second output signal from the switch, the second output signal having a second value of the two possible values, determining whether receiving the second output signal corresponds to a switch bouncing condition, when receiving the second output signal does not correspond to the switch bouncing condition, actuating the process control device based on the second output signal, and when receiving the second output signal corresponds to the switch bouncing condition, preventing actuation of the process control device.

FIG. 1 depicts an example process control system 100 including a multiple-contact switch 102 to control a process control device, which in this example is depicted as a valve. The example process control system 100 of FIG. 1 monitors a level of a liquid 104 in a vessel, container, or liquid tank 106 using a sensor such as a liquid level detector 108. The example multiple-contact switch 102 is mechanically coupled to the liquid level detector 108 to determine whether a liquid level 110 sensed by a physical position of the liquid level detector 108 is higher (or lower) than a threshold level 112. As the liquid level 110 increases or decreases, the physical position of the liquid level detector 108 rises and falls, respectively. The example multiple-contact switch 102 outputs a signal having two possible values (e.g., open/close, on/off, etc.) to a microcontroller 114. Thus, the value of the output signal from the multiple-contact switch 102 is dependent on whether the liquid level 110 (e.g., determined by the physical position of the liquid level detector 108) is higher (or lower) than the threshold level 112.

To output a signal, the example multiple-contact switch 102 of FIG. 1 includes a double-throw switch 116, a first throw circuit 118, and a second throw circuit 120. The example double-throw switch 116 connects a common contact to one of the first throw circuit 118 or the second throw circuit 120 at any given time. Based on which of the example throw circuits 118, 120 to which the double-throw switch is connected to the common contact (e.g., whether the liquid level 110 is above (or below) the threshold level 112), the example multiple-contact switch 102 (e.g., the first throw circuit 118 or the second throw circuit 120) outputs one of two possible output values.

The example microcontroller 114 of FIG. 1 causes an actuator 122 to open or close a valve 124 based on the signal output from the example multiple-contact switch 102. In the example of FIG. 1, the example microcontroller 114 causes the actuator 122 to open the valve 124 when the liquid level 110 is higher than the threshold level 112. Opening the example valve 124 causes liquid 104 from the liquid tank 106 to exit the liquid tank 106 via an exit fluid passage 126, thereby lowering the liquid level 110. Conversely, the example microcontroller 114 causes the actuator 122 to close the valve 124 when the liquid level 110 is below the threshold level 112. Closing the example valve 124 stops the liquid 104 from exiting the tank 106.

Figure 2:
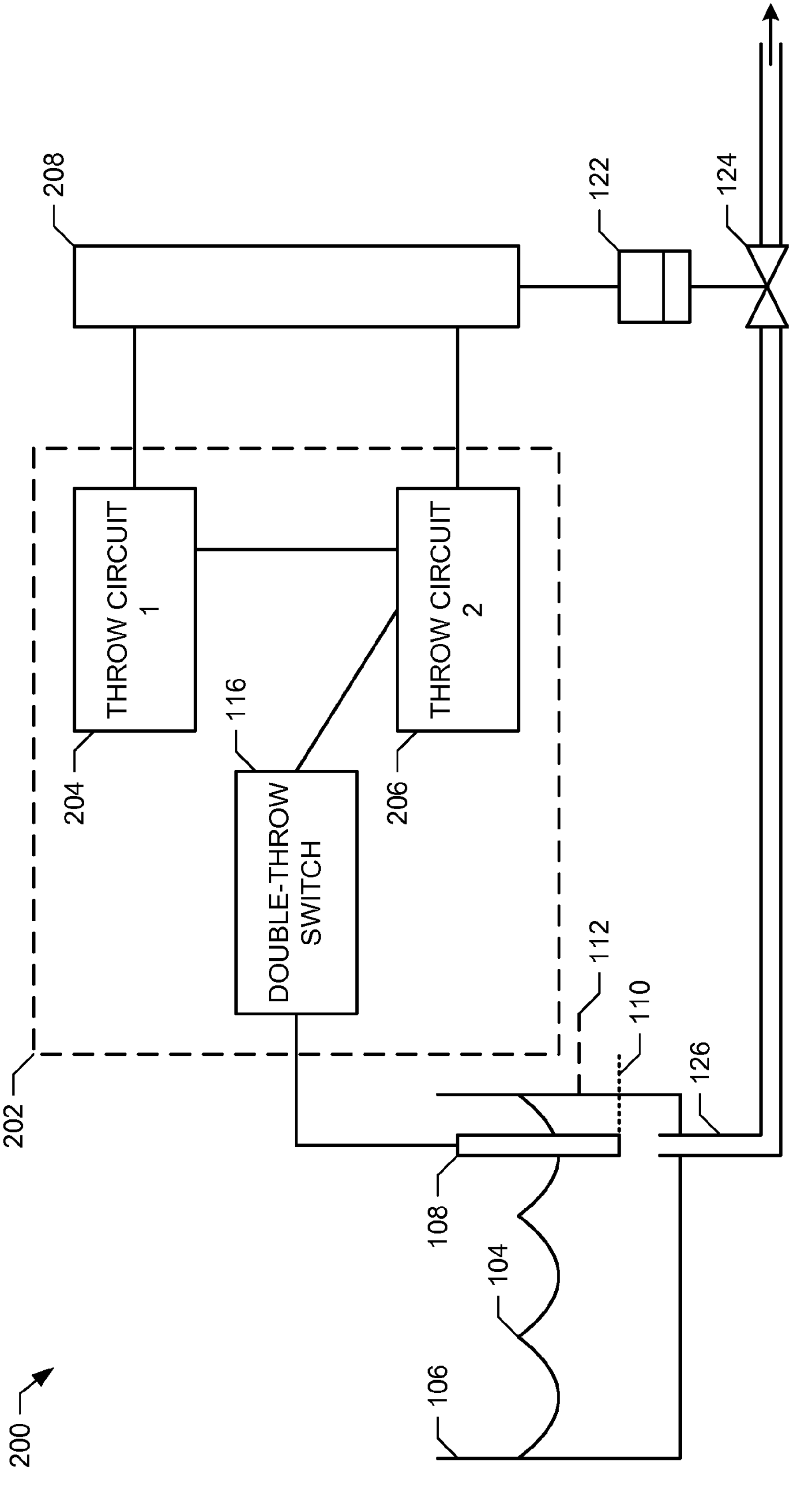
FIG. 2 depicts another example process control system including a multiple-contact switch to control a valve.

FIG. 2 depicts another example process control system 200 including a multiple-contact switch 202 to control a valve. Like the example multiple-contact switch 102 of FIG. 1, the example multiple-contact switch 202 includes the double-throw switch 116 coupled to one of a first throw circuit 204 or a second throw circuit 206 at any given time. Additionally, the example multiple-contact switch outputs a first output signal from the first throw circuit 204 to a microcontroller 208. However, unlike the example multiple-contact switch 102, the example multiple-contact switch 202 of FIG. 2 also outputs a second output signal from the second throw circuit 206. The first throw circuit 204 and the second throw circuit 206 output the first and second output signals based on whether the example double-throw switch 116 is electromechanically coupled to the first throw circuit 204 or the second throw circuit 206.

The example microcontroller 208 of FIG. 2 receives the first and second output signals from the multiple-contact switch 202 and determines whether the signals correspond to a first state (e.g., on, open, etc.), a second state (e.g., off, close, etc.) or an invalid state (e.g., an error state). For example, if the first output signal is a logical high signal and the second output signal is a logical low signal, the microcontroller 208 may determine that the multiple-contact switch 202 is in a first state. Conversely, if the first output signal is a logical low signal and the second output signal is a logical high signal, the microcontroller 208 may determine that the multiple-contact switch 202 is in a second state. If the first and second output signals have the same logical value (e.g., high or low), the example microcontroller 208 may determine that an invalid state has occurred (e.g., the double throw switch 116 is not in contact with either of the throw circuits 204, 206, a circuit problem has occurred, etc.).

Figure 3:
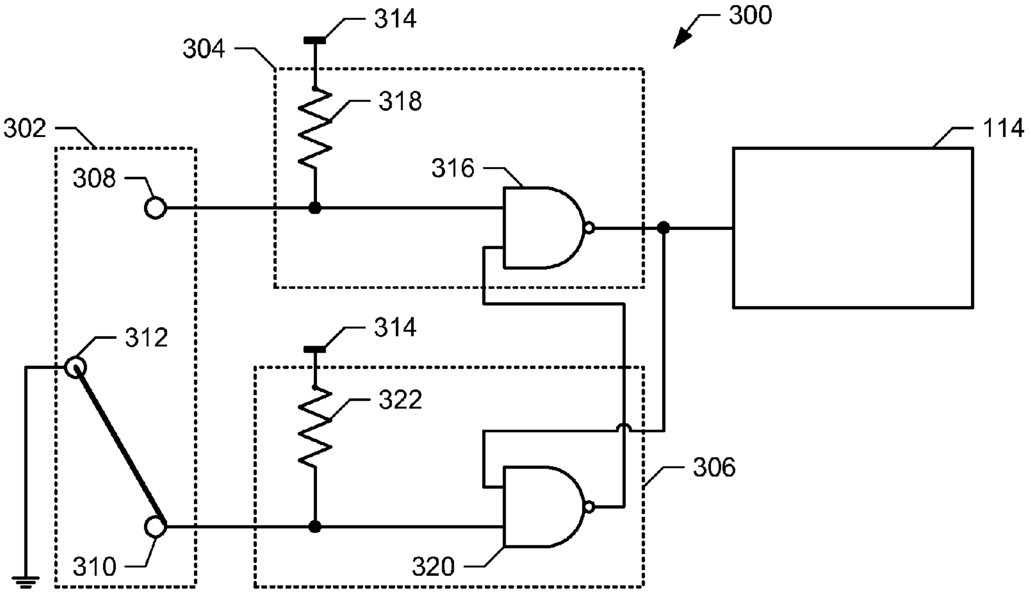
FIG. 3 is a schematic diagram of an example multiple-contact switch to control a process control device.

FIG. 3 is a schematic diagram of an example multiple-contact switch 300 to control the process control device (e.g., the valve 124). The example multiple-contact switch 300 may be used to implement the multiple-contact switch 102 of FIG. 1. As shown in FIG. 3, the example multiple-contact switch 300 includes a double throw switch 302, a first throw circuit 304, and a second throw circuit 306. The first throw circuit 304 is coupled to a first terminal 308 of the double throw switch 302, and outputs a first or second signal to a microcontroller (e.g., the microcontroller 114 of FIG. 1) based on the position of the example double throw switch 302. The example second throw circuit 306 is coupled to a second terminal 310 of the example double throw switch 302, and causes the first throw circuit 304 to output the first or second signal based on the position of the example double throw switch 302.

The example double throw switch 302 of FIG. 3 includes the first and second terminals 308, 310 and a common terminal 312. The common terminal 312 is switched between the terminals 308, 310. The example common terminal 312 is generally electromechanically coupled to one of the first or second terminals 308, 310 at any given time, with the exception that the example double throw switch 302 uses a break-before-make method when switching between the terminals 308, 310. The example common terminal 312 is electrically coupled to a reference signal (e.g., ground). The example reference signal of FIG. 3 corresponds to one of the output signals, such as a low, off, or logical zero signal. A contrasting high, on, or logical one signal is a voltage reference 314.

The example first throw circuit 304 includes a two-input not-and (NAND) logic gate 316 and a pull-up resistor 318. A first terminal of the NAND gate 316 is coupled to the first terminal 308 of the double throw switch 302 and to the high reference 314 via the pull-up resistor 318. Similarly, the example second throw circuit 306 includes a two-input not-and (NAND) logic gate 320 and a pull-up resistor 322. A first terminal of the NAND gate 320 is coupled to the second terminal 310 of the double throw switch 302 and to the high reference 314 via the pull-up resistor 322. The output of the NAND gate 320 is input to the second terminal of the NAND gate 316. The output of the NAND gate 316 is input to the second terminal of the NAND gate 320 and is used as the output of the example multiple-contact switch 300.

In combination, the example first and second throw circuits 304, 306 ensure that the output from the multiple-contact switch 300 of FIG. 3 to the microcontroller 114 does not change states unless the common contact 312 changes from being coupled to one of the terminals 308, 310 to the other one of the terminals 308, 310. For example, the first and second throw circuits 304, 306 maintain the state of the output signal if there is electromechanical bouncing (e.g., rapid connection and disconnection) between the common terminal 312 and one of the terminals 308, 310.

An example of operation of the multiple-contact switch 300 of FIG. 3 is described below. In describing the example operation, the common terminal 312 and the reference to which it is coupled (e.g., ground) will be referred to as a low signal, and the high reference 314 (e.g., a supply signal) will be referred to as a high signal. The low and high signals are used as logical states. In operation, the common terminal 312 may be coupled to the second terminal 310 at a first time. As a result, the first terminal of the NAND gate 320 is pulled to the low signal, thereby causing the NAND gate 320 to output a high signal to the second input terminal of the NAND gate 316. The first terminal of the NAND gate 316 is pulled to the high signal via the pull-up resistor 318. Because both input terminals to the NAND gate 316 are a high signal, the output of the NAND gate (and the output of the multiple-contact switch 300) to the microcontroller 114 is a low signal.

At a second time after the first time, the example double throw switch 302 may switch the common terminal 312 to connect to the first terminal 308. The first terminal 308 and, thus, the first terminal of the NAND gate 316 is pulled to the low signal, causing the output of the NAND gate 316 to become a high signal. The high signal output from the NAND gate 316 is input to the first terminal of the NAND gate 320. The second terminal of the NAND gate 320 is pulled to the high signal by the pull-up resistor 322. Because both input terminals to the NAND gate 320 are a high signal, the output of the NAND gate 320 is a low signal. This low signal is input to the second terminal of the NAND gate 316.

At a third time after the second time, the example double throw switch 302 experiences bouncing and rapid electromechanical connection and disconnection with the first terminal 308. While the first terminal 308 is temporarily disconnected from the common terminal 312 (e.g., the low signal), the first terminal of the NAND gate 316 may be pulled up to the high signal via the pull-up resistor 318. However, the output of the example NAND gate 316 does not change to the low signal because the input to the second terminal of the NAND gate 316 remains at the low signal. Similarly, if the double throw switch 302 experiences bouncing with the second terminal 310 at the first time discussed above, the output from the example NAND gate 320 does not change because the input to the first terminal of the NAND gate 320 remains at the low signal despite the bouncing. Thus, the example multiple-contact switch 300 of FIG. 3 is desensitized to or immune from bouncing without requiring time-delay and/or other circuitry that reduces the responsiveness of the multiple-contact switch 300.

While the example multiple-contact switch 300 includes NAND gates and pull-up resistors, and high and low signals, any other types of logic gates, signal levels, and/or pull-up and/or pull-down resistors may be used to obtain similar functionality.

Figure 4:
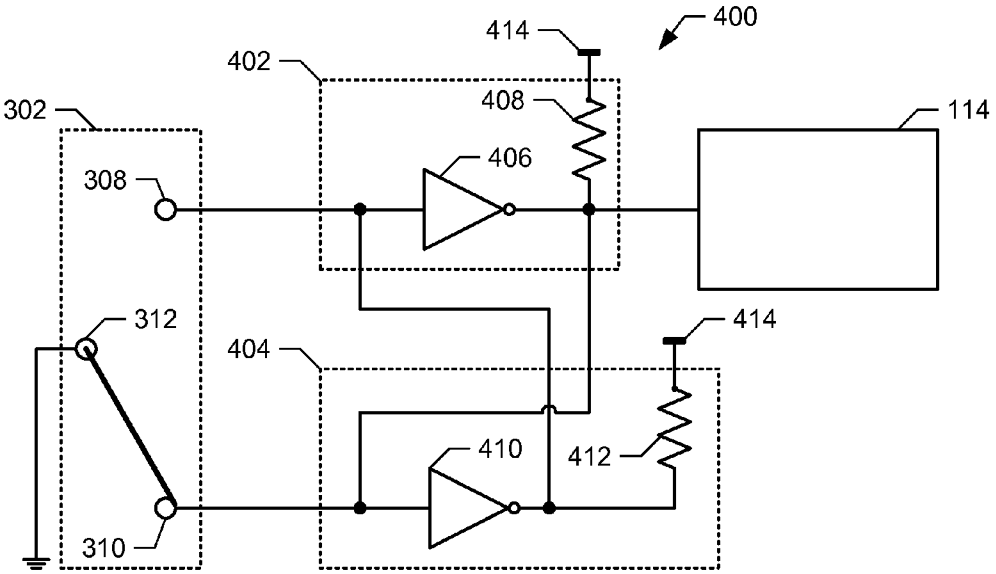
FIG. 4 is a schematic diagram of another example multiple-contact switch to control a process control device.

FIG. 4 is a schematic diagram of another example multiple-contact switch 400 to control a process control device. The example multiple-contact switch 400 may be used to implement the multiple-contact switch 102 of FIG. 1. As shown in FIG. 4, the example multiple-contact switch 400 includes the example double throw switch 302 of FIG. 3, a first throw circuit 402, and a second throw circuit 404. As described above, the example double throw switch 302 includes the first and second terminals 308, 310, and a common terminal 312 electrically coupled to a reference (e.g., a low signal).

The example first throw circuit 402 of FIG. 4 includes an inverter or a NOT logic gate 406 and a pull-up resistor 408. Similarly, the example second throw circuit 404 includes a NOT logic gate 410 and a pull-up resistor 412. The output of the example first throw circuit 402 (e.g., the output of the NOT gate 406) is input to a microcontroller (e.g., the example microcontroller 114 of FIG. 1). The first terminal 308 of the double throw switch 302 is coupled to the input terminal of the example NOT gate 406. The output of the NOT gate 406 is pulled-up to a supply reference 414 (e.g., a high signal) via the pull-up resistor 408. The second terminal 310 of the double throw switch 302 is coupled to the input terminal of the example NOT gate 410, which is also coupled to the output of the NOT gate 406. The output of the example NOT gate 410 is also pulled up to the supply reference 414 via the pull-up resistor 412 and is coupled to the input terminal of the NOT gate 406.

An example of operation of the multiple-contact switch 400 of FIG. 4 is described below. In describing the example, the common terminal 312 and the reference to which it is coupled (e.g., ground) will be referred to as a low signal, and the high reference 414 (e.g., a supply signal) will be referred to as a high signal. The low and high signals correspond to logical states. In operation, the example common terminal 312 is coupled to the second terminal 310 at a first time. As a result, the output of the multiple-contact switch 400 is coupled directly to the low signal. Additionally, the input to the example NOT gate 410 is a low signal, causing the output of the NOT gate 410 to be a high signal. The high signal output from the NOT gate 410 is input to the NOT gate 406, resulting in a low output from the NOT gate 406 consistent with being coupled to the common terminal 312.

At a second time after the first time, the common terminal 312 is decoupled from the second terminal 310 and coupled to the first terminal 308. At that time, the input to the example NOT gate 406 is a low signal, causing the NOT gate 406 to output a high signal from the multiple-contact switch 400 to the example microcontroller 114. The output from the NOT gate 406 is also input to the example NOT gate 410, causing the NOT gate 410 to output a low signal. The low signal is directly coupled to the first terminal 308 and is consistent with being connected to the common terminal 312.

At a third time after the second time, the example double throw switch 302 experiences bouncing and rapid electromechanical connection and disconnection with the first terminal 308. While the first terminal 308 is temporarily disconnected from the common terminal 312 (e.g., the low signal), the input terminal to the NOT gate 406 is disconnected from the common terminal 312. However, the low signal output from the example NOT gate 410 maintains the low signal input to the NOT gate 406, which causes the NOT gate 410 to maintain the high output signal to the example microcontroller 114. Similarly, if the double throw switch 302 experiences bouncing with the second terminal 308 at the first time discussed above, the output from the example NOT gate 406 does not change because the input terminal of the NOT gate 410 remains at the low signal despite the bouncing due to the output from the NOT gate 406. Thus, the example multiple-contact switch 400 of FIG. 4 is desensitized or even immune from bouncing without requiring time-delay and/or other circuitry that reduces the responsiveness of the multiple-contact switch 400.

While the example multiple-contact switch 400 includes NOT gates and pull-up resistors, and high and low signals, any other types of logic gates, signal levels, and/or pull-up and/or pull-down resistors may be used to obtain similar or equivalent functionality.

Figure 5:
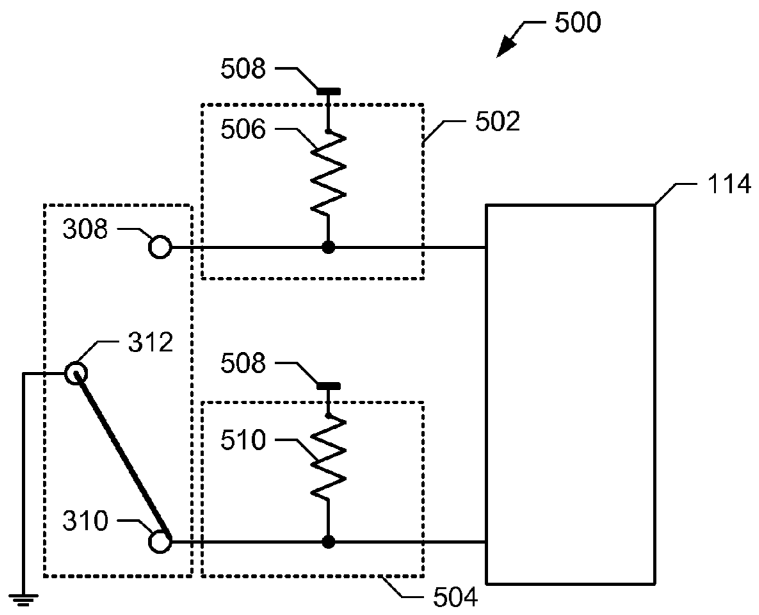
FIG. 5 is a schematic diagram of another example multiple-contact switch to control a process control device.

FIG. 5 is a schematic diagram of another example multiple-contact switch 500 to control a process control device. The example multiple-contact switch 500 may be used to implement the multiple-contact switch 202 of FIG. 2. As shown in FIG. 5, the example multiple-contact switch 500 includes the example double throw switch 302 of FIG. 3, as well as a first throw circuit 502 and a second throw circuit 504. The first throw circuit 502 is coupled to the first terminal 308 of the double throw switch 302, and outputs a first signal to a microcontroller (e.g., the microcontroller 114 of FIG. 1) based on the position of the example double throw switch 302. The example second throw circuit 504 is coupled to the second terminal 310 of the example double throw switch 302 and outputs a second signal to the microcontroller 114 based on the position of the double throw switch 302.

The example first throw circuit 502 includes a pull-up resistor 506 to pull-up the first terminal 308 and the output of the first throw circuit 502 to a high reference 508. Similarly, the second throw circuit 504 includes a pull-up resistor 510 to pull-up the second terminal 310 and the output of the second throw circuit 504 to the high reference 508. In operation, the example double throw switch 302 connects the common terminal 312 to one of the first or second terminals 308, 310. When the first terminal 308 is coupled to the common terminal 312, the first throw circuit 502 outputs a low signal to the microcontroller 114 and the second throw circuit 504 outputs a high signal to the microcontroller 114. Conversely, when the second terminal 310 is coupled to the common terminal 312, the first throw circuit 502 outputs a high signal to the microcontroller 114 and the second throw circuit 504 outputs a low signal to the microcontroller 114.

The example microcontroller 114 determines a state of the multiple-contact switch 500 based on the combination of outputs from the first and second throw circuits 502, 504. For example, if the output from the first throw circuit 502 is a high signal and the output from the second throw circuit 504 is a low signal, the microcontroller 114 determines that the multiple-contact switch 114 is in a first state. Conversely, if the output from the first throw circuit 502 is a low signal and the output from the second throw circuit 504 is a high signal, the microcontroller 114 determines that the multiple-contact switch 114 is in a second state. In the example of FIG. 5, the microcontroller 114 detects an error if both outputs from the multiple-contact switch 500 are low signals, because such a condition may correspond to a malfunction of the switch 500. If the microcontroller 114 detects that both outputs from the multiple-contact switch 500 are high signals, the microcontroller determines that the example multiple-contact switch 500 may be experiencing bouncing and/or some other error. In response to detecting that both outputs are high signals, the microcontroller 114 samples the outputs from the multiple-contact switch 500 multiple times to determine whether either of the outputs has changed to a low signal and/or to determine whether one of the outputs has stopped bouncing. For example, if the microcontroller 114 detects that a threshold number of consecutive samples of the output signal from the example second throw circuit 504 are low signals while the output signal from the first throw circuit remains high, the multiple-contact switch 500 has changed to the first state. In some examples, the microcontroller 114 may determine that an error condition exists if a certain amount of time elapses (or other condition occurs) without the multiple-contact switch 500 achieving the first state or the second state.

While the example multiple-contact switch 500 includes pull-up resistors and high and low signals, any other types of signal levels, logic, and/or pull-up and/or pull-down resistors may be used to obtain similar or equivalent functionality. Additionally, while the example multiple contact switches 300, 400 of FIGS. 3 and 4 are illustrated as having a single output signal to the microcontroller 114, either of the example switches 300, 400 may output second signals (e.g., from the respective second throw circuits 306, 404) to the microcontroller 114. In some such examples, the microcontroller 114 may implement state-detecting and/or error-detecting methods such as the example state-detecting and/or error-detecting methods described above with reference to FIG. 5.

Figure 6:
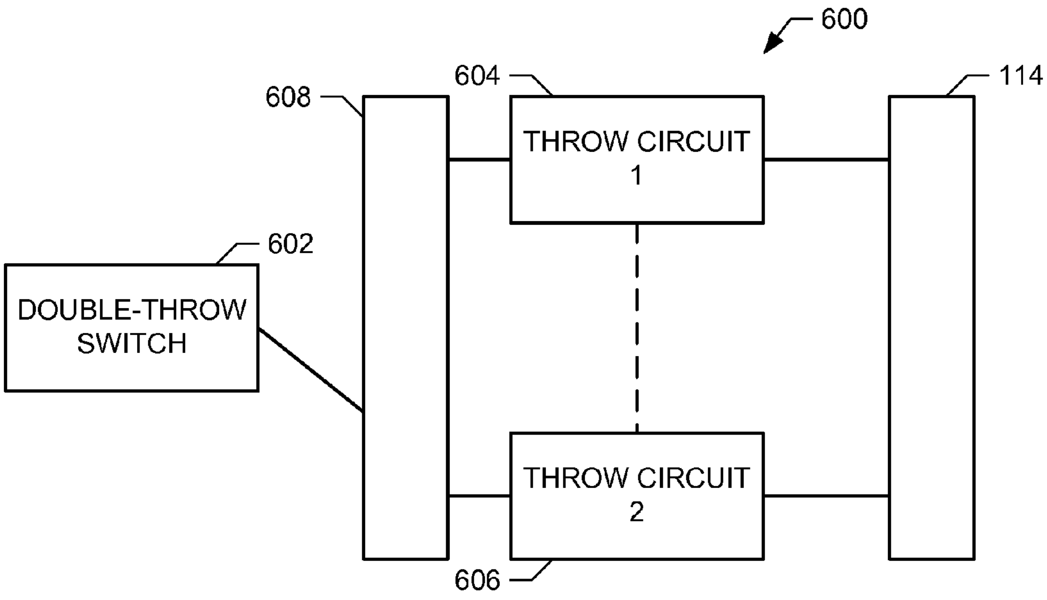
FIG. 6 is a schematic diagram of an example multiple-contact switch including an error trigger to control a process control device.

FIG. 6 is a schematic diagram of another example multiple-contact switch 600 to control a process control device. The example multiple-contact switch 600 of FIG. 6 includes a double throw switch 602, first and second throw circuits 604, 606, and an error trigger 608. The example double throw switch 602 of FIG. 6 may be implemented using the example double throw switch 302 of FIGS. 3-5. The example first and second throw circuits 604, 606 may be implemented using the example first and second throw circuits 304, 306 of FIG. 3, the example first and second throw circuits 402, 404 of FIG. 4, the example first and second throw circuits 502, 504 of FIG. 5, and/or any other equivalent, similar, and/or different configurations of throw circuits. Accordingly, the example first and second throw circuits 604, 606 may or may not be interconnected as illustrated in FIG. 6 by a dashed line connecting the throw circuits 604, 606.

The example error trigger 608 triggers error detection by the microprocessor 114 via the first and second throw circuits 604, 606 when an external error condition occurs. To trigger error detection, the error trigger 608 may cause the outputs of both throw circuits 604, 606 to be low signals or high signals. An external error condition includes errors not caused by internal malfunction of the example multiple-contact switch 600 and/or the microcontroller 114. An example external error condition may include a loss of an external source of power to the multiple-contact switch 600 and/or the microcontroller 114. In such an example, the error trigger 608, such as a controller of an uninterruptible power supply (UPS), controls the first and second throw circuits 604, 606 to output low signals to the microcontroller (e.g., in response to detecting loss of supply power and use of power stored in the UPS). In the example, the UPS provides power to the multiple-contact switch 600, to the microcontroller 114, and/or to a process control device controlled by the microcontroller 114 to change the state of the process control device to a predetermined or default safety condition. An example safety condition may include controlling the actuator 122 to close the example valve 124 of FIG. 1. The example microcontroller 114 may use the example state-detecting and/or error-detecting methods described above with reference to FIG. 5 to detect the state(s) and/or error(s) in the example multiple-contact switch 600, including error(s) triggered by the example error trigger 608 via the first and second throw circuits 604, 606.

Figure 7:
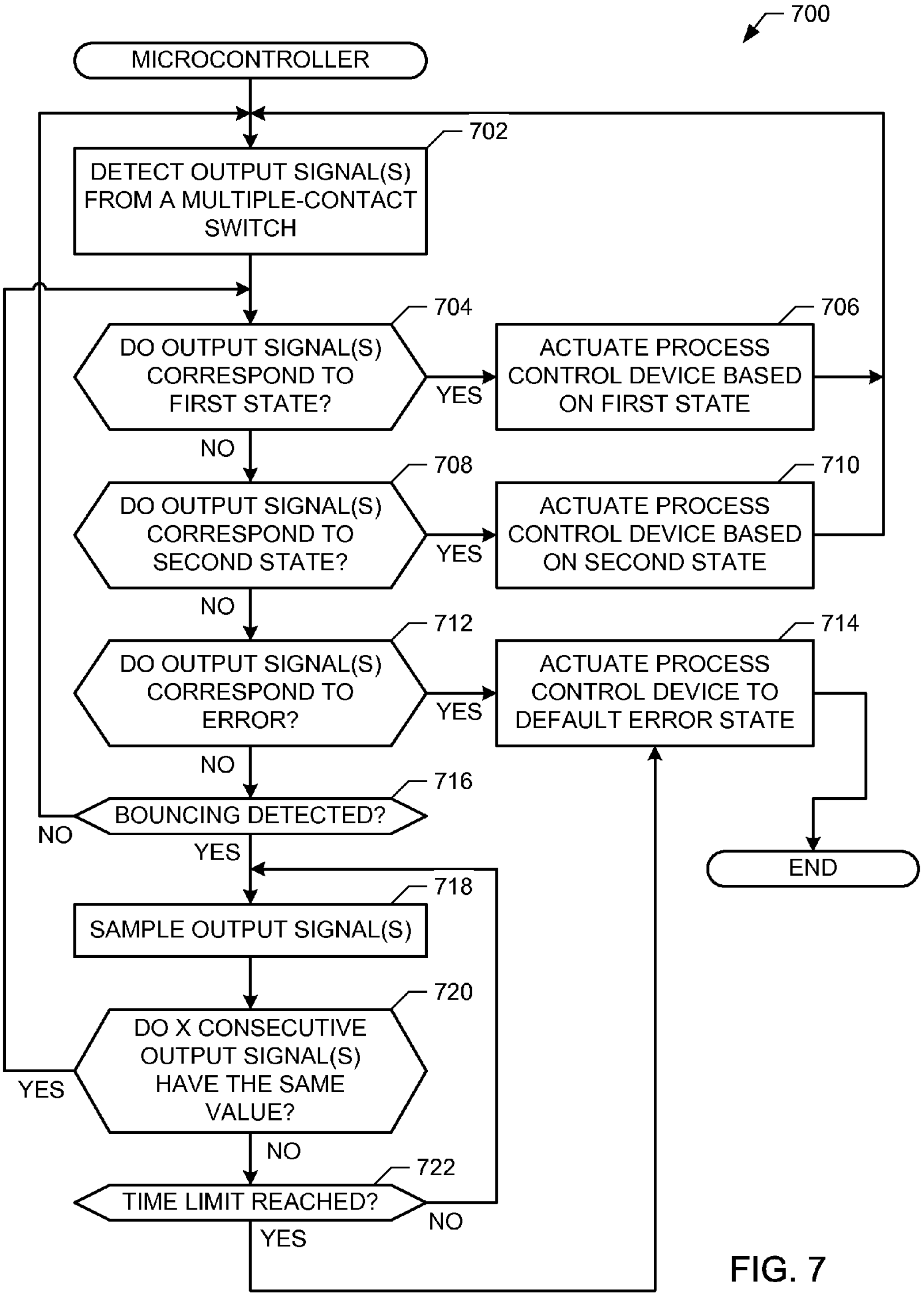
FIG. 7 is a flowchart representative of an example process that may be used to implement the example controllers of FIGS. 3-5 to control a process control device based on input from a multiple-contact switch.

FIG. 7 is a flowchart representative of an example process 700 that may be used to implement the example microcontroller 114 of FIGS. 1-6 to control a process control device based on input from a multiple-contact switch.

The example process 700 of FIG. 7 begin by detecting (e.g., via the microcontroller 114 of FIGS. 1-6) output signal(s) from a multiple-contact switch (e.g., the multiple-contact switches 102, 202, 300, 400, 500, and/or 600 of FIGS. 1-6) (block 702). For example, the microcontroller 114 may receive one or more output signal(s) from respective throw circuits 118, 120, 204, 206, 304, 306, 402, 404, 502, 504, 604, 606 of FIGS. 1-6). The example microcontroller 114 determines if the output signal(s) correspond to a first state (block 704). If the output signal(s) correspond to the first state (block 704), the example microcontroller 114 actuates a process control device based on the first state (block 706). For example, the microcontroller 706 may cause a valve actuator to open a valve in response to the first state. After actuating the process control device (block 706), control returns to block 702 to detect the output signal(s).

If the output signal(s) do not correspond to the first state (block 704), the example microcontroller 114 determines if the output signal(s) correspond to a second state (block 708). If the output signal(s) correspond to the second state (block 708), the example microcontroller 114 actuates a process control device based on the second state (block 710). For example, the microcontroller 114 may cause a valve actuator to close a valve in response to the second state. After actuating the process control device (block 710), control returns to block 702 to detect the output signal(s).

If the output signal(s) do not correspond to the second state (block 708), the example microcontroller 114 determines if the output signal(s) correspond to an error (block 712). For example, the output signal(s) may correspond to an error if the output signal(s) are consistent with a malfunction of the multiple-contact switch. If the output signal(s) correspond to an error (block 712), the example microcontroller 114 actuates the process control device to a default (e.g., predetermined) error state (block 714). After actuating the process control device to the default error state (block 714), the example process 700 of FIG. 7 ends.

If the output signal(s) do not correspond to an error (block 712), the example microcontroller 114 determines whether bouncing is detected (block 716). For example, bouncing may be detected when different ones of the output signal(s) correspond to different ones of the first and second states. If bouncing is not detected (block 716), control returns to block 702 to detect the output signal(s). On the other hand, if bouncing is detected (block 716), the example microcontroller 114 samples the output signal(s) (block 718). For example, the microcontroller 114 may sample the output signal(s) multiple times to obtain consecutive samples.

The example microcontroller 114 then determines whether a threshold number X of consecutive output signal(s) have the same value (block 720). If the threshold number X of consecutive output signal(s) have the same value (block 720), the example microcontroller 114 determines that the bouncing has ended and returns to block 704 to determine the state of the output signal(s). If a threshold number of output signal(s) having the same value has not been found (block 720), the example microcontroller 114 determines whether a time limit has been reached (block 722). If the time limit has not been reached (block 722), control returns to block 718 to continue sampling output signal(s). On the other hand, if the time limit has been reached (block 722), the example microcontroller 114 actuates the process control device to the default error state (block 714). The example process 700 of FIG. 7 may then end.

Although certain example apparatus and methods have been described herein, the scope of coverage of this patent is not limited thereto. On the contrary, this patent covers all apparatus and methods fairly falling within the scope of the claims of this patent.

What is claimed is:

1. A multiple-contact switch, comprising:
- a sensor to measure a process control parameter, wherein the sensor is a liquid level detector in a liquid tank;
- a double throw switch having a common terminal, a first throw terminal, and a second throw terminal, the common terminal being coupled to a reference, the double throw switch communicatively coupled to the sensor, the double throw switch to electrically couple the common terminal to one of the first throw terminal or the second throw terminal based on the process control parameter;

- a first throw circuit coupled to the first throw terminal, the first throw circuit to output a first control signal having a first value to a process control device when the common terminal is substantially in contact with one of the first throw terminal or the second throw terminal; and
- a second throw circuit coupled to the second throw terminal, the second throw circuit to cause the first throw circuit to output a second control signal having a second value to the process control device when the common terminal is substantially in contact with the other one of the first throw terminal or the second throw terminal, wherein at least one of the first control signal or the second control signal corresponds to the reference, wherein the first and second throw circuits are to maintain the first control signal or the second control signal in response to bouncing by the double throw switch.

2. A switch as defined in claim 1, wherein the first and second throw circuits comprise respective logic gates to maintain respective states of the first and second throw circuits when the double throw switch has not switched the common terminal from contacting one of the first or second throw terminals to the other one of the first or second throw terminals.

3. A switch as defined in claim 1, wherein the first throw circuit comprises a first not-and logic gate and a first pull-up resistor and the second throw circuit comprises a second not-and logic gate and a second pull-up resistor.

4. A switch as defined in claim 3, wherein an output terminal of the first not-and gate is coupled to an input terminal of the second not-and gate and an output terminal of the second not-and gate is coupled to an input terminal of the first not-and gate.

5. A switch as defined in claim 1, wherein the first throw circuit comprises a first not logic gate and a first pull-up resistor and the second throw circuit comprises a second not logic gate and a second pull-up resistor.

6. A switch as defined in claim 5, wherein an output terminal of the first not gate is coupled to an input terminal of the second not gate and an output terminal of the second not gate is coupled to an input terminal of the first not gate.

7. A switch as defined in claim 1, wherein the first throw circuit is to output the first control signal until the common terminal comes into contact with the second throw terminal and is to output the second control signal when the common terminal comes into contact with the second throw terminal.

8. A multiple-contact switch, comprising:
- a sensor to measure a process control parameter, wherein the sensor is a liquid level detector in a liquid tank;
- a double throw switch having a common terminal, a first throw terminal, and a second throw terminal, the common terminal being coupled to a reference, the double throw switch communicatively coupled to the sensor, the double throw switch to electrically couple the common terminal to one of the first throw terminal or the second throw terminal based on the process control parameter;
- a first throw circuit coupled to the first throw terminal, the first throw circuit to output a first control signal to a process control device when the common terminal is substantially in contact with one of the first throw terminal or the second throw terminal; and
- a second throw circuit coupled to the second throw terminal, the second throw terminal to output a second control signal to the process control device when the common terminal is substantially in contact with the other one of the first throw terminal or the second throw terminal, wherein at least one of the first control signal or the second control signal corresponds to the reference; and a controller to actuate the process control device based on receiving the first signal or the second control signal.

9. A switch as defined in claim 8, wherein the controller is to determine whether a switch bounce has occurred in response to receiving the first control signal or the second control signal.

10. A switch as defined in claim 9, wherein the controller is to prevent actuation of the process control device in response to determining that the switch bounce has occurred.

11. A switch as defined in claim 9, wherein the controller is to determine whether the switch bounce has occurred by sampling the first control signal or the second control signal at least a threshold number of times to determine whether the samples have an equal value.

12. A switch as defined in claim 11, wherein the controller is to determine the switch bounce has occurred when at least a threshold number of consecutive samples have an equal value.

13. A switch as defined in claim 8, further comprising an error trigger to cause the first and second throw circuits to output signals corresponding to an error condition in response to detecting an external error condition.

14. A switch as defined in claim 8, wherein the first throw circuit comprises a first pull-up resistor and the second throw circuit comprises a second pull-up resistor.

15. A method, comprising:

measuring a process control parameter using a sensor, wherein the sensor is a liquid level detector in a liquid tank;

receiving a first output signal from a double throw switch based on measuring the process control parameter, the first output signal having a first value of two possible values, the double throw switch being electrically coupled to the sensor;

receiving a second output signal from the double throw switch based on measuring the process control parameter, the second output signal having a second value of the two possible values;

determining whether receiving the second output signal corresponds to a switch bouncing condition by determining whether at least a threshold number of consecutive samples have an equal value, wherein the second output signal does not correspond to the switch bouncing condition when at least the threshold number of consecutive samples have an equal value;

when receiving the second output signal does not correspond to the switch bouncing condition, actuating a process control device based on the second output signal; and when receiving the second output signal corresponds to the switch bouncing condition, preventing actuation of the process control device.

16. A method as defined in claim 15, further comprising detecting an error condition in response to determining that threshold length of time has elapsed without determining that the threshold number of consecutive samples have an equal value.

17. A method as defined in claim 15, further comprising detecting an error condition when the first and second output signals have values not associated with actuation states of the process control device.

18. A switch as defined in claim 1, wherein the process control device is a fluid actuator.

19. A switch as defined in claim 8, wherein the process control device is a fluid actuator.

* * * * *